Feb. 16, 1932.  V. JANTSCH  1,845,418

BATTERY COVER

Filed Nov. 30, 1928

Inventor
Victor Jantsch
By Blackmore, Spencer & Hulse
Attorney

Patented Feb. 16, 1932

1,845,418

UNITED STATES PATENT OFFICE

VICTOR JANTSCH, OF PONTIAC, MICHIGAN, ASSIGNOR TO YELLOW TRUCK AND COACH MANUFACTURING COMPANY, OF PONTIAC, MICHIGAN, A CORPORATION OF MAINE

BATTERY COVER

Application filed November 30, 1928. Serial No. 322,847.

This invention relates to supports for carrying a storage battery or the like on a motor vehicle and more particularly to a protective cover to overlie the top of the battery and save it from injury and damage.

The present invention was primarily designed for use in connection with the battery mounting that forms the subject matter of my pending application S. N. 229,113 (now Patent No. 1,791,815, granted February 10, 1931,) and which as used in the past, has been located under the driver's seat beside the gasoline or fuel supply tank. It has been found that an uncovered battery mounted in such place is subject to considerable harm particularly through the carelessness of gasoline station attendants or others who replenish the supply of fuel from time to time. Ordinarily, the gasoline is put into the tank through a long hose leading from a pump, and in moving the nozzle on the end of the hose to and from the filler opening or spout of the tank, some of the gasoline is very often accidentally spilled on the top of the battery, and in some instances the end of the nozzle is negligently allowed to drag across the terminals or plugs which obviously is exceedingly harmful to the battery.

One of the objects of this invention is to provide a simple and inexpensive structure that can be readily and easily applied to the regular battery mounting, either as new equipment on existing vehicles or as standard equipment on new cars, without necessitating any change in the design of the standard construction, and which will effectively protect the battery from injury.

Figure 1:
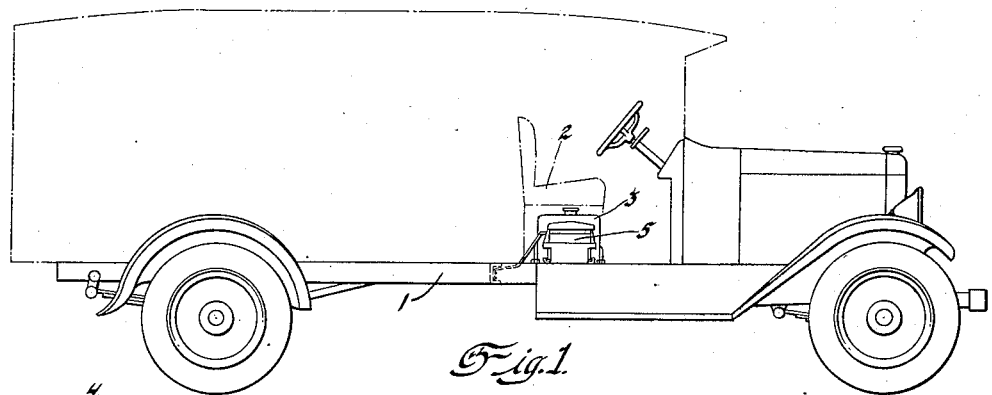
Figure 2:
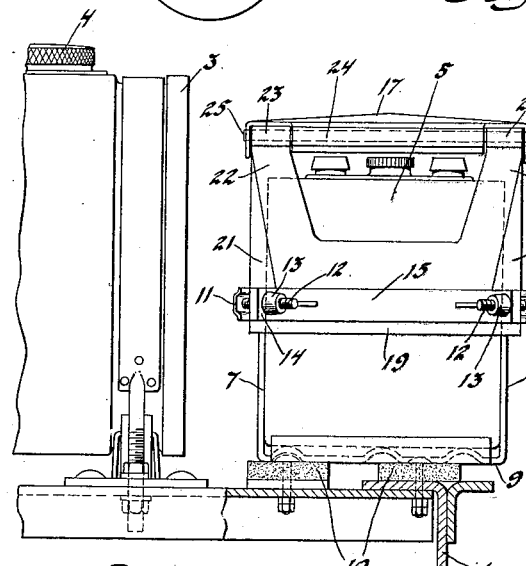
Figure 3:
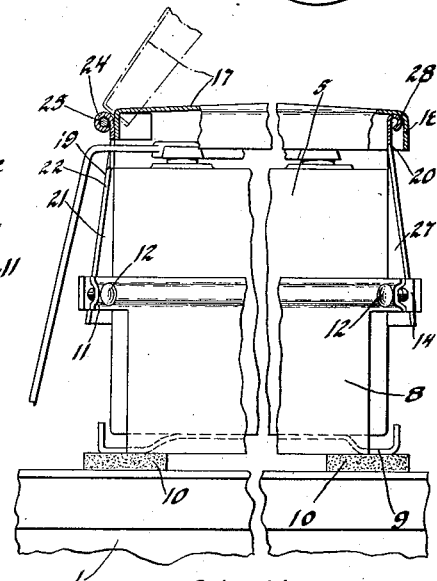
Figure 4:
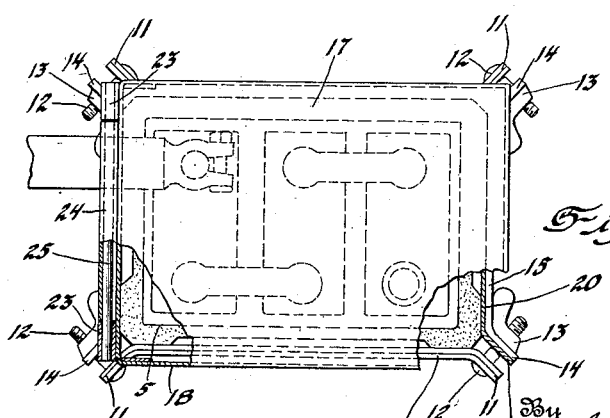

Other objects and advantages will be apparent from the following specification when taken in connection with the accompanying drawings, wherein Fig. 1 is a side elevation of a motor vehicle illustrating the application of the invention thereto; Fig. 2 is an end elevation, Fig. 3 is a side elevation; and Fig. 4 is a top plan view respectively, of the battery support and cover forming the present subject matter.

Referring to the preferred but not necessarily the only embodiment of the invention as illustrated in the accompanying drawings, the character indicates the chassis frame of a motor vehicle and 2 the driver's seat, beneath which is located the storage battery 5 and the gasoline tank 3, having a closure cap 4 over its filler opening or spout. The battery 5 is supported in a U-shaped member having upstanding side portions 7—8 and a base portion 9 which is bolted down to the chassis frame 1. Blocks 10 of cushioning material, such as rubber, are preferably interposed between the frame and base 9 for the purpose of absorbing vibration and strains. At each end of the upper portion of the plates 7 and 8 there is provided an out turned ear 11 extending substantially at an angle of 45° and which is secured by a bolt 12 having a wing nut 13 thereon to a similar ear 14 formed at opposite ends of a pair of straps 15. The side members 7 and 8 and end members 15 constitute in effect a rectangular frame, within which is inserted the battery 5 and which is contractible and expansible upon adjustment of the wing nuts at each corner of the frame to permit removal and replacement of a battery in the support. The contraction of the frame effects a firm clamping of the battery therein by the contact of the frame parts with the vertical walls of the battery, and the clamping action is distributed over a large area, whereby localization of the clamping effort, which might tend to place undue strain on the battery case and cause its distortion is prevented. The structure thus far described is fully set forth and disclosed in my pending application S. N. 229,113 before mentioned.

The present invention contemplates the addition of a cover for the top of the battery consisting of a cover plate proper, indicated by the numeral 17, which has a dependent marginal flange 18, and a pair of end plates 19 and 20 which, if desired, may be substantial duplicates of each other for the purpose of economy in manufacture. The end plate 19 is provided at each side with a diagonal wing or ear 21 which is to be secured by a corner bolt 12 between an ear 11 and an ear 14, and it is also provided with a pair of legs or arms 22 extending upwardly and having their ends curled over or bent around to form eyes 23. At one side of the cover plate 17 the dependent marginal flange 18 is also curled around to form an eye 24, and a hinge pin or pintle 25 extends through the eyes 23 and 24 to provide a hinge joint about which the cover 17 may be swung. The end plate 20 is likewise formed with wings 27 by which the plate is mounted between the ears 11 and 14 by the bolt 12, and its upper end is also curled over as at 28 to form an eye, over which curled eye, the flange 18 of the cover 17 rides when the cover is moved to closed position. The end plates 19 and 20 preferably have a certain degree of inherent resiliency or spring and they are so arranged that when the cover is moved to closed position, they will be sprung inwardly or towards each other and their outward tension will maintain a tight frictional contact between the curled over portion 28 and flange 18 to thereby hold the cover in its closed position. The cover plate 17 is preferably given a slight convex or dome shape so as to provide inclined surfaces in all directions, whereby any liquid such as spilled gasoline will flow off to the side.

It will be obvious that the cover herein described eliminates any possibilities of damage to the top of the battery, either by negligent handling of the nozzle on the end of the hose or by the accidental dropping of liquid or some object on the battery. The cover may be readily swung to open position to permit inspection of the battery and replacement of evaporated water in the individual cells or the removal and replacement of the battery upon the proper adjustment of the several wing nuts 12. As will be evident the addition of the cover to the regular battery support will merely necessitate the removal of the adjustment bolts and their subsequent replacement with the end plates 19 and 20 inserted in proper position.

I claim:

1. A cover for use in conjunction with a battery mounting wherein side and end members form a frame to receive the battery and each member has outturned ears at its ends, the adjacent ears of said members having an adjustable element extending therethru by means of which the frame is contractible into clamping contact with the walls of the battery, comprising a pair of upstanding plates, each having outturned ears interposed between adjacent ears of said side and end members and held in place by the adjustable element connecting said ears, and both plates having their upper portions curled over to form eyes, a cover plate adapted to overlie the battery and having a dependent marginal flange, one portion of which is adapted for frictional contact with the eye of one of said plates and another portion of which is curled over to form an eye, and a hinge pin projecting thru the last mentioned eye and the eye of the other of said plates.

2. A cover for use in conjunction with a battery mounting wherein side and end members form a frame to receive the battery and each member has outturned ears at its ends, the adjacent ears of said members having an adjustable element extending therethru by means of which the frame is contractible into clamping contact with the walls of the battery, comprising a pair of upstanding plates, each having outturned ears interposed between adjacent ears of said side and end members and held in place by the adjustable element connecting said ears, and a covering element removably carried by said plates over the top of the battery.

3. A cover for use in conjunction with a battery mounting wherein side and end members form a frame to receive the battery and each member has outturned ears at its ends, the adjacent ears of said members having an adjustable element extending therethru by means of which the frame is contractible into clamping contact with the walls of the battery, comprising a pair of upstanding plates at opposite ends of the frame, each having portions thereof secured at the ears by the adjustable element, and a cover positioned by said plates over the top of the battery.

4. A cover for use in conjunction with a battery mounting wherein side and end members form a frame to receive the battery and each member has outturned ears at its ends, the adjacent ears of said members having an adjustable element extending therethru by means of which the frame is contractible into clamping contact with the walls of the battery, comprising an upstanding plate having a portion thereof for attachment at a set of adjacent ears by the adjustable element, and a cover carried by the plate over the top of the battery.

In testimony whereof I affix my signature.

VICTOR JANTSCH.